(12) United States Patent
Rohrmoser

(10) Patent No.: US 11,807,291 B2
(45) Date of Patent: Nov. 7, 2023

(54) STEERING-RACK-FORCE OPTIMISED STEERING SENSATION OF A STEER-BY-WIRE MOTOR VEHICLE STEERING SYSTEM

(71) Applicants: thyssenkrupp Presta AG, Eschen (LI); thyssenkrupp AG, Essen (DE)

(72) Inventor: Manuel Rohrmoser, Thüringen (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 460 days.

(21) Appl. No.: 17/265,234

(22) PCT Filed: Aug. 6, 2019

(86) PCT No.: PCT/EP2019/071080
§ 371 (c)(1),
(2) Date: Feb. 2, 2021

(87) PCT Pub. No.: WO2020/030621
PCT Pub. Date: Feb. 13, 2020

(65) Prior Publication Data
US 2021/0221431 A1 Jul. 22, 2021

(30) Foreign Application Priority Data
Aug. 8, 2018 (DE) .................... 10 2018 119 268.1

(51) Int. Cl.
*B62D 6/00* (2006.01)
(52) U.S. Cl.
CPC .................... *B62D 6/008* (2013.01)

(58) Field of Classification Search
CPC ..................................................... B62D 6/008
See application file for complete search history.

(56) References Cited

U.S. PATENT DOCUMENTS 11,465,678 B2 * 10/2022 Kashi ..................... B62D 6/008
2004/0107032 A1 6/2004 Farrelly et al.
(Continued)

FOREIGN PATENT DOCUMENTS

| CN | 101716951 A | 6/2010 |
| CN | 101860305 A | 10/2010 |

(Continued)

OTHER PUBLICATIONS

English Translation of International Search Report issued in PCT/EP2019/071080, dated Dec. 11, 2019.

*Primary Examiner* — Ryan Rink
(74) *Attorney, Agent, or Firm* — thyssenkrupp North America, LLC

(57) ABSTRACT

A method can be used to adapt a steering torque for controlling a feedback actuator of a steer-by-wire motor vehicle steering system. The method may involve providing a basic steering torque, providing a rack-force-based steering torque, determining a difference between the basic steering torque and the rack-force-based steering torque, and if the difference exceeds a predetermined limit value adapting the basic steering torque to the rack-force-based steering torque and transmitting a resulting steering torque to control the feedback actuator. However, if the difference remains below the predetermined limit value, then the method may involve transmitting the basic steering torque to control the feedback actuator.

10 Claims, 3 Drawing Sheets

(56) References Cited

U.S. PATENT DOCUMENTS

| | | | |
|---|---|---|---|
| 2005/0235744 A1* | 10/2005 | Ogawa | B60C 23/001 73/146 |
| 2006/0129293 A1* | 6/2006 | Bernzen | B62D 6/008 701/41 |
| 2010/0268422 A1 | 10/2010 | Blommer et al. | |
| 2012/0072074 A1 | 3/2012 | Greul et al. | |
| 2017/0297613 A1* | 10/2017 | Sakaguchi | G05B 13/041 |
| 2017/0327145 A1 | 11/2017 | Sakaguchi et al. | |
| 2019/0118853 A1 | 4/2019 | Delmarco et al. | |
| 2019/0168807 A1 | 6/2019 | Polmans | |
| 2019/0300049 A1 | 10/2019 | Birsching | |
| 2020/0130737 A1* | 4/2020 | Kodera | B62D 6/008 |
| 2021/0245800 A1* | 8/2021 | Kitazume | B62D 5/0463 |
| 2021/0371008 A1* | 12/2021 | Hwang | B62D 6/008 |
| 2022/0315105 A1* | 10/2022 | Kuragaki | B62D 15/025 |

FOREIGN PATENT DOCUMENTS

| | | | |
|---|---|---|---|
| CN | 101863283 A | | 10/2010 |
| CN | 105083373 A | | 11/2015 |
| CN | 106864589 A | | 6/2017 |
| CN | 107207041 A | | 9/2017 |
| CN | 108290601 A | | 7/2018 |
| DE | 103 32 023 A | | 2/2004 |
| DE | 10 2010 048 991 A | | 4/2012 |
| DE | 10 2016 009 684 A | | 2/2018 |
| JP | 2005225355 A | | 8/2005 |
| JP | 2007008292 A | | 1/2007 |
| JP | 2012131427 A | | 7/2012 |
| JP | 2015120518 A | | 7/2015 |
| KR | 20160092226 A | | 8/2016 |

\* cited by examiner

STEERING-RACK-FORCE OPTIMISED STEERING SENSATION OF A STEER-BY-WIRE MOTOR VEHICLE STEERING SYSTEM

CROSS REFERENCE TO RELATED APPLICATIONS

This application is a U.S. National Stage Entry of International Patent Application Serial Number PCT/EP2019/071080, filed Aug. 6, 2019, which claims priority to German Patent Application No. DE 10 2018 119 268.1, filed Aug. 8, 2018, the entire contents of both of which are incorporated herein by reference.

FIELD

The present disclosure generally relates to methods for controlling steer-by-wire steering systems and to methods for adapting steering torque for controlling a feedback actuator of steer-by-wire motor vehicle steering systems.

BACKGROUND

In steer-by-wire steering systems, the position of the steered wheels is not directly coupled to the steering input means, for example a steering wheel. A connection exists between the steering wheel and the steered wheels by means of electrical signals. The driver steering demand is picked off by a steering angle sensor, and the position of the steered wheels is controlled by means of a steering actuator in a manner dependent on the driver steering demand. A mechanical connection to the wheels is not provided, and therefore, after actuation of the steering wheel, no direct force feedback is transmitted to the driver. However, correspondingly adapted feedback is provided, for example during parking or during straight-ahead travel, in the case of which a steering torque which is adapted to the vehicle reaction and differs depending on the vehicle manufacturer is desired as force feedback. During cornering, reaction forces act as transverse forces on the steering gear, which reaction forces are replicated by the feedback actuator in the form of a torque opposing the steering direction. The driver experiences a resultantly predefinable steering sensation. In order, in the case of steer-by-wire steering systems, to simulate the retroactive effects of the road on the steering wheel, a feedback actuator (FBA) has to be provided at the steering wheel or the steering column, said feedback actuator imparting a steering sensation to the steering handle in a manner dependent on the desired retroactive effects.

Conventionally, in the case of electric servo steering systems (EPS), the feedback characteristics of the steering system are determined by the rack force which is exerted on the rack by the tie rods, which are attached to the wheels via the running gear. The rack force is primarily influenced by the current cornering forces. Thus, a major part of the current rack force corresponds to a transverse acceleration. The rack force is however not only determined by the transverse forces that arise while traveling around a corner, and it is rather the case that a multiplicity of further variables of a current driving situation have an influence on the rack force. One example thereof is the road condition (unevennesses, lane grooves, friction coefficient).

The currently prevailing rack force can be ascertained by means of a torque sensor arranged on the rack or by estimation by means of an "observer" based on a model of the steering system. Such a method is disclosed, for example, in laid-open specification DE 103 320 23 A1. In this document, for the determination of a steering torque for the EPS steering system of a vehicle, the steering torque is determined in a manner dependent on the transverse force occurring at steered wheels or in a manner dependent on the actual steering torque. The known method provides for the transverse force to be estimated or modeled by means of a sensor or on the basis of a model of the steering system of the vehicle in a manner dependent on at least one of the variables of transverse acceleration, steering angle and vehicle speed.

This model has proven to be disadvantageous because it does not take into consideration further disturbance influences, such as for example roadway conditions, and therefore does not have the desired accuracy.

In steer-by-wire steering systems, an artificially produced steering torque is currently used for activating the feedback actuator. It is highly complicated in this case to reproduce the road feedback and the steering sensation in and over a limit range in terms of driving dynamics.

Thus a need exists for a method for adapting a steering torque for controlling a feedback actuator of a steer-by-wire motor vehicle steering system, and a method for controlling a steer-by-wire steering system for motor vehicles, said methods permitting a more accurate reproduction of a realistic steering sensation. Furthermore, a need exists for a steer-by-wire steering system that permits improved steering characteristics.

DETAILED DESCRIPTION

Figure 1:
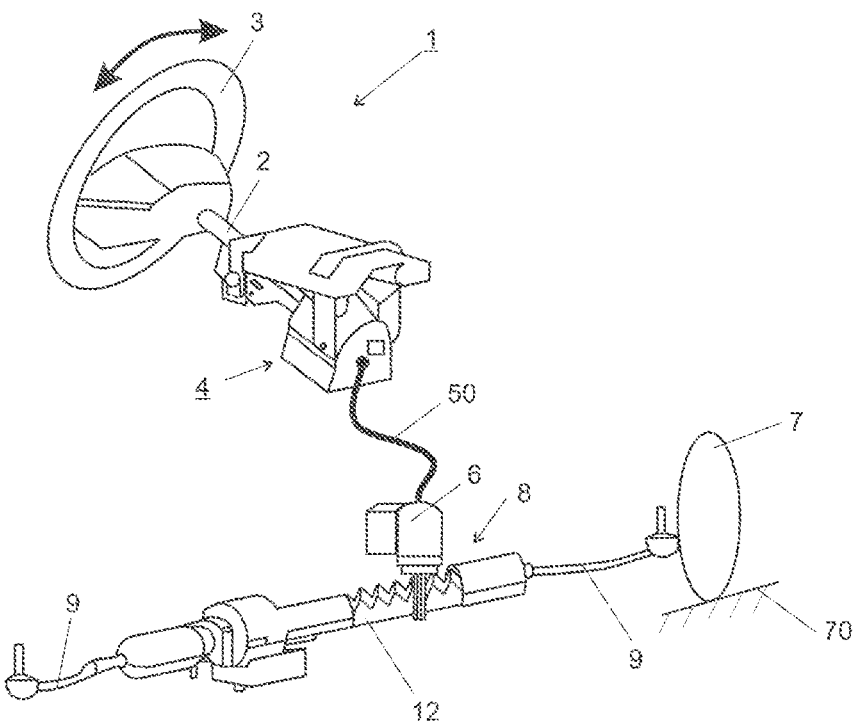
FIG. 1 is a schematic view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods for adapting a steering torque for controlling a feedback actuator of a steer-by-wire motor vehicle steering system. The present disclosure also generally relates to steer-by-wire steering systems and to methods for controlling steer-by-wire steering systems.

Accordingly, a method for adapting a steering torque for controlling a feedback actuator of a steer-by-wire motor vehicle steering system is provided, having the following steps:

providing a basic steering torque,
providing a rack-force-based steering torque,
forming a difference between the basic steering torque and the rack-force-based steering torque,
if the difference exceeds a predetermined limit value, adapting the basic steering torque to the rack-force-based steering torque and transmitting the resulting steering torque in order to control the feedback actuator,
if the difference remains below the predetermined limit value, transmitting the basic steering torque in order to control the feedback actuator.

By means of the adaptation of the basic steering torque in the event of an excessive deviation, the resulting steering sensation becomes highly realistic without the advantages of a basic steering sensation being lost.

The limit value is preferably formed by forming an uncertainty band around the rack-force-based steering torque. It is advantageous here if the uncertainty band is symmetrical with respect to the value of the rack-force-based steering torque. The uncertainty band is stretched upward and downward at a regular distance from the basic steering torque. Said fixedly defined uncertainty band is formed in the manner of a shell around the basic steering torque.

In an advantageous embodiment, the uncertainty band has an upper band limit of 125% of the value of the rack-force-based steering torque and a lower band limit of 75% of the value of the rack-force-based steering torque. However, it can also be provided that the upper band limit is 115% of the value of the rack-force-based steering torque and the lower band limit is 85% of the value of the rack-force-based steering torque.

Preferably, the band distance between the two band limits of the uncertainty band is at least 20% and at most 60% of the value of the rack-force-based steering torque.

The basic steering torque is preferably produced from a vehicle speed and a steering angle present at the steering wheel, and is configured here for high friction coefficient roads. An optimized steering sensation that corresponds to an electromechanical steering system can thus be transmitted to the driver. To produce the basic steering torque, further parameters, such as steering wheel speed, rack position or rack speed, can preferably be included.

The rack-force-based steering torque is preferably determined by means of estimating the rack force, the vehicle speed and the measured rack position. The rack force is preferably determined by an estimation based on a steering gear model. This preferably comprises a non-linear steering gear model. The estimation based on a steering gear model is based on rack information, such as, for example, the rack position and a torque inquiry and is independent of carriageway information. The estimation based on a steering gear model can be furthermore extended by an estimation based on a vehicle model, in order to improve the quality of the feedback from the road to the driver and thus the steering sensation. An estimated rack force based on a steering gear model is determined in one unit, and an estimated linear rack force which is based on a vehicle model and in which carriageway information is implemented is determined in a further unit. The values of the two rack forces are compared with each other, when necessary adapted to the determined rack force based on a vehicle model and a resulting rack force is determined therefrom. The determined or adapted resulting rack force is subsequently converted into the rack-force-based steering torque. The further adaptation of the steering torque takes place, as described previously, by the comparison between the basic steering torque and the rack-force-based steering torque.

The adaptation preferably comprises scaling the difference which is then given as an offset to the basic steering torque. Scaling is preferably carried out in a state if the driver is undertaking oversteering or understeering.

Furthermore, a method for controlling a steer-by-wire steering system for a motor vehicle is provided, comprising:

an electronically controllable steering actuator which acts on the steered wheels,
an activation unit,
a feedback actuator which can have a driver demand for a steering angle applied to it by a driver by way of a steering input means and which outputs a feedback signal to the steering input means in reaction to the driver demand and to a driving state of the motor vehicle,
a signal transmission means which transmits the driver demand to the activation unit,
wherein the activation unit activates the steering actuator in order to transform the driver demand into a deflection of the steered wheels,
wherein the feedback signal is implemented in a manner dependent on a steering torque, and the steering torque is determined by means of a method as described above.

In addition, a steer-by-wire steering system for a motor vehicle is provided, comprising:

an electronically controllable steering actuator which acts on the steered wheels,
an activation unit,
a feedback actuator which can have a driver demand for a steering angle applied to it by a driver by way of a steering input means and which outputs a feedback signal to the steering input means in reaction to the driver demand and to a driving state of the motor vehicle,
a device for signal transmission which transmits the driver demand to the activation unit,
wherein the activation unit activates the steering actuator in order to transform the driver demand into a deflection of the steered wheels, and wherein the steer-by-wire steering system is configured to carry out a method as described above. In particular, the activation unit which has an evaluation unit carries out the method.

Figure 2:
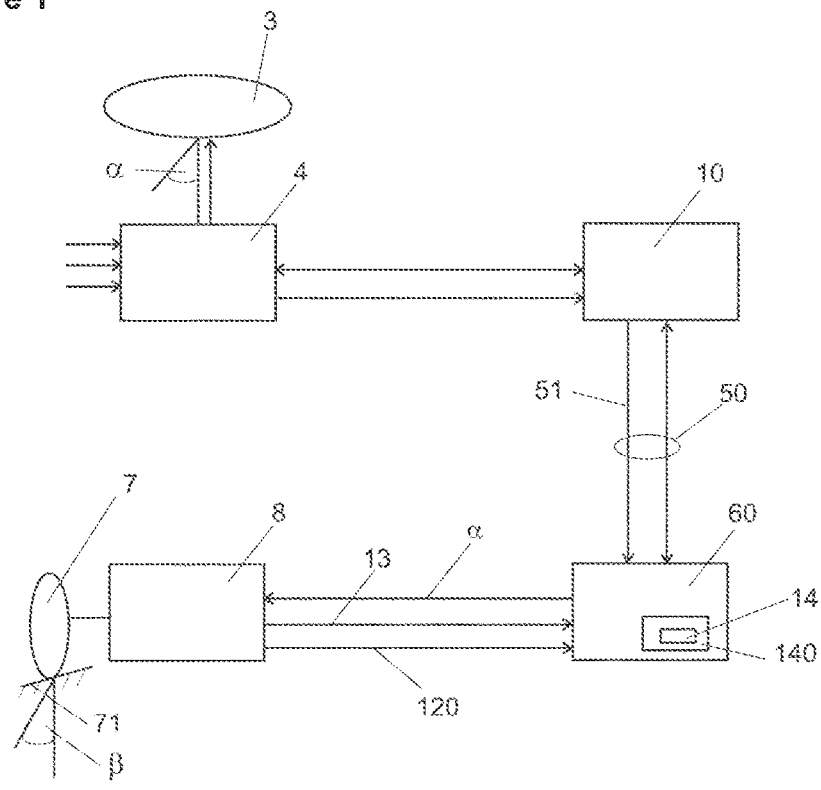
FIG. 2 is a block diagram of an example controller of the steer-by-wire steering system.

FIG. 1 shows a steer-by-wire steering system 1. Attached to a steering shaft 2 is a rotational angle sensor (not illustrated) which detects the driver steering angle imparted by rotation of a steering input means 3, which in the example is in the form of a steering wheel. It is however additionally also possible for a steering torque to be detected. A joystick may serve as steering input means. Also attached to the steering shaft 2 is a feedback actuator 4 which serves for simulating the retroactive effects of the carriageway 70 on the steering wheel 3 and thus for providing the driver with feedback regarding the steering and driving characteristics of the vehicle. The driver steering demand is, by means of the rotational angle α, measured by the rotational angle sensor, of the steering shaft 2, transmitted via signal lines to a feedback actuator monitor unit 10, as illustrated in FIG. 2. The feedback actuator monitor unit 10 transmits the driver steering demand to the activation unit 60. The feedback actuator monitor unit 10 preferably also performs the activation of the feedback actuator 4. The feedback actuator monitor unit 10 may also be formed integrally with the activation unit 60. The activation unit 60 activates, in a manner dependent on the signal of the rotational angle sensor and further input variables, an electrical steering actuator 6 which controls the position of the steered wheels 7. The steering actuator 6 acts indirectly on the steered wheels 7 via a steering-rack-type steering gear 8, such as, for example, a rack-type steering gear, and via tie rods 9 and other components.

FIG. 2 shows a controller of the feedback actuator 4. The feedback actuator 4 receives signals via a signal line 50 inter alia from the rotational angle sensor, which measures and stores the steering angle α, the steering angle acceleration and the steering angle speed. The feedback actuator 4 communicates with a feedback actuator monitor unit 10, which controls the feedback actuator 4. The feedback actuator monitor unit 10 receives, from an activation unit 60 of the steering actuator 6, the actual wheel steering angle β of the steered wheels 7 and further variables that the activation unit 60 has ascertained. The rack position 120 measured at a rack 12, and further carriageway information 13 are transmitted to the activation unit 60. The activation unit 60 has a module 14 for determining the rack force. The module 14 for determining the rack force uses a rack force $F_{r,estrack}$ which is based on a steering gear model and is estimated using the measured rack position 120 and the steering torque introduced by the driver. The determined rack force 14 is used in an evaluation unit 140 for adapting a basic steering torque. The feedback actuator 4 is activated in accordance with the resulting steering torque which thus produces a steering sensation. The activation unit 60 furthermore receives steering commands 51 from a driver, such as the steering angle status.

Figure 3:
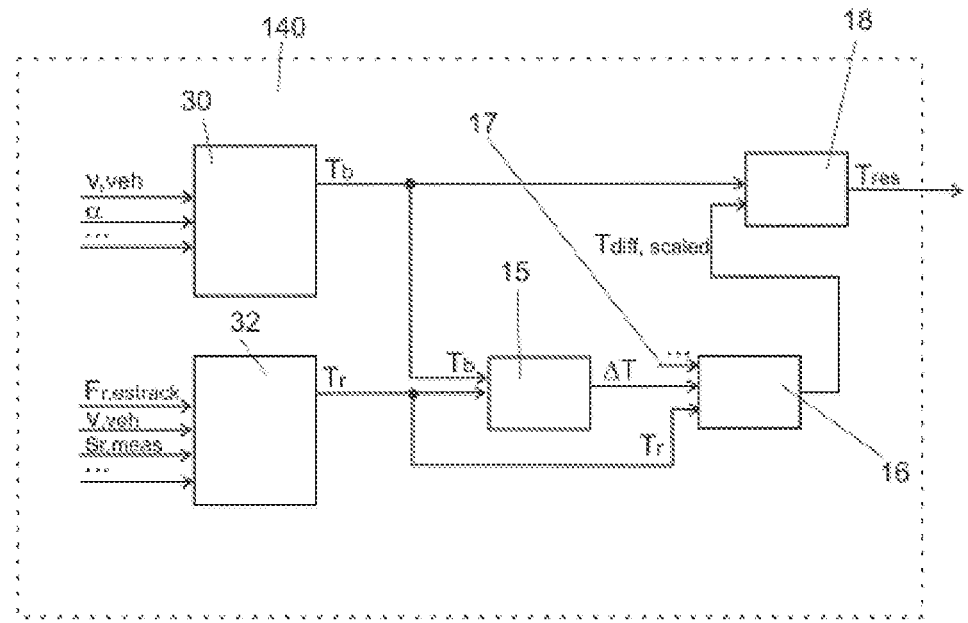
FIG. 3 is a block diagram of an example module for adapting a steering torque.

FIG. 3 illustrates the evaluation unit 140 in detail. A basic steering torque $T_b$ is produced in a unit 30 from the vehicle speed $v_{veh}$ and a steering angle present at the steering wheel or a steering wheel speed, and is configured for high friction coefficient roads, i.e. it is assumed that the friction coefficient of the carriageway has a high friction coefficient in order thereby to replicate an electromechanical steering system. A high friction coefficient arises for example on dry asphalt, while a mean friction coefficient arises in the event of snow and a low friction coefficient arises in the case of ice.

A steering sensation resulting from the basic steering torque $T_b$ does not have any discontinuities and is therefore highly agreeable for the driver. However, road feedback (friction coefficient and the like) is very complicated to reproduce here.

In addition to the basic steering torque $T_b$, a rack-force-based steering torque $T_r$ is provided. Said rack-force-based steering torque $T_r$ is determined in a unit 32 by means of estimating the rack force $F_{r,estrack}$, based on a steering gear model, the vehicle speed $v_{veh}$ and the measured rack position $s_{r,meas}$ and optionally further parameters.

In order to enable the road feedback (lane grooves, unevennesses, road friction coefficient, etc.) to also be included in the steering sensation, the basic steering torque $T_b$ is compared according to the invention with the rack-force-based steering torque $T_r$ and scaled if necessary, particularly if there is oversteering or understeering.

In a first step, the basic steering torque $T_b$ and the rack-force-based steering torque $T_r$ are compared by a differential calculation 15. The difference between the two values ΔT is included in a scale 16. Since the rack-force-based steering torque $T_r$ entails certain uncertainties, a dynamically produced uncertainty band is placed around the rack-force-based steering torque $T_r$. The respective value of the rack-force-based steering torque $T_r$ is reduced (lower band limit) or increased (upper band limit) by +/−25%, preferably +/−15%. In addition to the differential value ΔT, information regarding the uncertainty 17 and the rack-force-based steering torque $T_r$ is therefore also included in the scale 16. In the scale 16, a scaled difference $T_{diff,scaled}$ is determined from the differential torque ΔT and the rack-force-based steering torque $T_r$ for the basic steering torque $T_b$, said difference being applied to the basic torque as an offset 18, wherein the resulting steering torque $T_{res}$ is used for controlling the steer-by-wire steering system.

Figure 4:
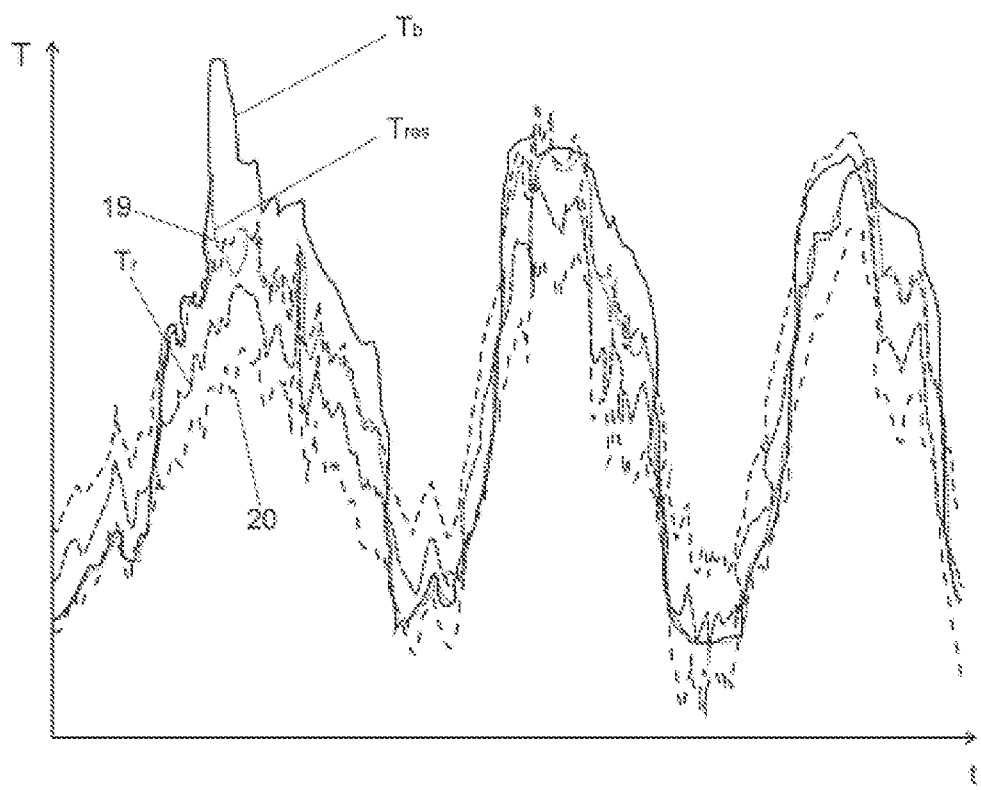
FIG. 4 is a time profile of a basic steering torque, of a steering torque calculated from a rack force, and of a resulting steering torque.

FIG. 4 shows the time profile of a basic steering torque $T_b$, an associated rack-force-based steering torque $T_r$ and the resulting steering torque $T_{res}$. The scaling takes place here as follows:

If the basic steering torque $T_b$ is within the upper and lower band limit 19, 20 of the uncertainty band of the rack-force-based steering torque $T_r$, the basic steering torque $T_b$ is not adapted, and the resulting steering torque $T_{res}$ corresponds to the basic steering torque $T_b$. If, by contrast, the basic steering torque $T_b$ is outside the uncertainty band, said basic steering torque is adapted to the rack-force-based steering torque $T_r$. The adaptation takes place depending on the driving situation preferably by scaling the difference between rack-force-based steering torque $T_r$ and the differential torque ΔT and is subsequently added as an offset to the basic steering torque $T_b$, i.e. by means of dead band regions on the uncertainty band. In the event of understeering or oversteering, the complete difference is added, and therefore the steering sensation corresponds exclusively to the modeled rack-force-based steering torque $T_r$. In the case of carriageways having a low friction coefficient or in the event of driving maneuvers in the limit range, the basic steering torque $T_b$ is correspondingly greatly modified in order to produce a realistic steering sensation.

The resulting steering torque $T_{res}$ is included in the feedback actuator controller. The resulting steering torque $T_{res}$ is therefore the calculated steering torque that as a reaction torque is intended to counteract the steering torque introduced into the steering wheel by the driver.

Figure 5:
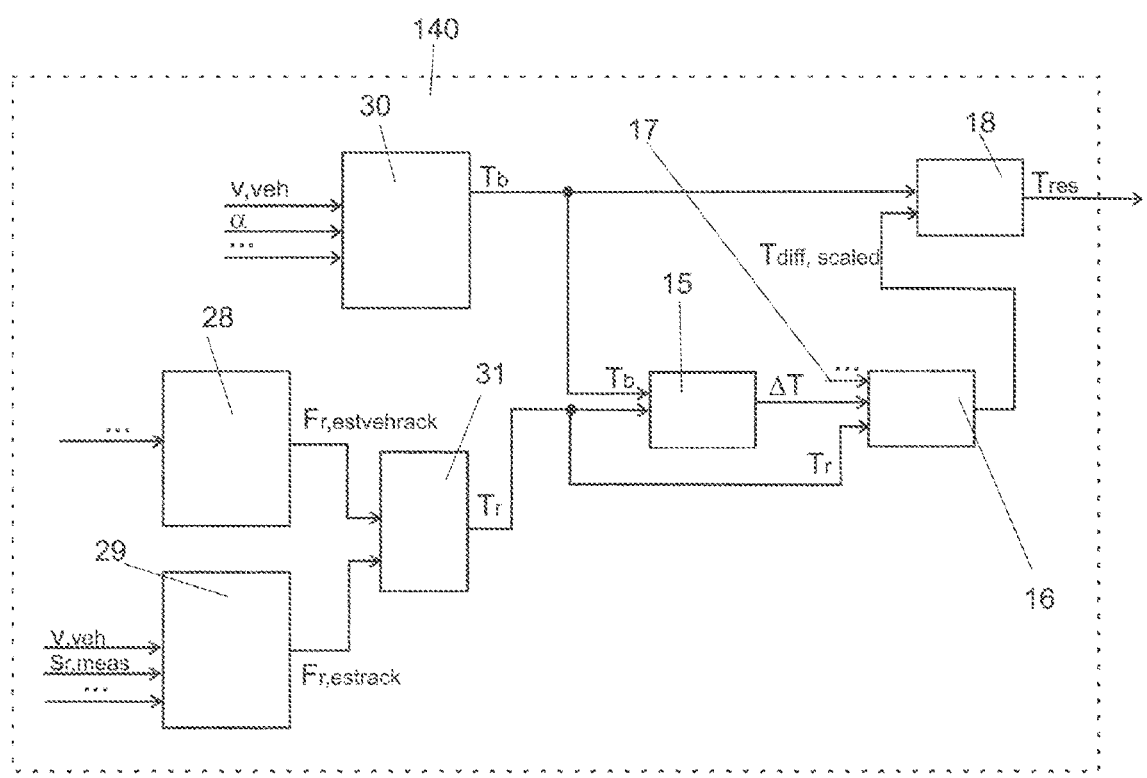
FIG. 5 is a block diagram of an example module for adapting the steering torque, which module is extended by a vehicle model.

FIG. 5 shows an alternative design of the evaluation unit 140 that is extended by a linear vehicle model in which carriageway information is implemented. In this case, as in FIG. 3, the basic steering torque $T_b$ is produced in the unit 30 from the vehicle speed $V_{veh}$ and a steering angle present at the steering wheel or a steering wheel speed and configured for high friction coefficient roads.

In addition to the basic steering torque $T_b$, a rack-force-based steering torque $T_r$ is provided. The rack-force-based steering torque $T_r$ is composed here of a rack force which arises from a linear vehicle-model-based estimation of the rack force $F_{r,estvehrack}$ and the steering-model-based rack force $F_{r,estrack}$. The vehicle-model-based rack force is determined in a unit 28 and the steering-gear-model-based rack force in a unit 29 from the vehicle speed $v_{veh}$ and the measured rack position $s_{r,meas}$. In the unit 31, the determined rack forces are compared and an estimated rack force is formed from the two values. Furthermore, the rack-force-based steering torque $T_r$ is formed in the unit 31 from the estimated rack force.

The resulting steering torque $T_{res}$ is determined as described for FIG. 3.

What is claimed is:

1. A method for adapting a steering torque for controlling a feedback actuator of a steer-by-wire motor vehicle steering system, the method comprising:
    providing a basic steering torque;
    providing a rack-force-based steering torque;
    determining a difference between the basic steering torque and the rack-force-based steering torque; and
    either
        adapting the basic steering torque to the rack-force-based steering torque and transmitting a resulting steering torque to control the feedback actuator if the difference exceeds a predetermined limit value, or
        transmitting the basic steering torque to control the feedback actuator if the difference is below the predetermined limit value.

2. The method of claim 1 comprising determining the predetermined limit value by forming an uncertainty band around the rack-force-based steering torque.

3. The method of claim 2 wherein a band distance between an upper band limit and a lower band limit of a value of the rack-force-based steering torque is between 20% and 60% of the value of the rack-force-based steering torque.

4. The method of claim 2 wherein the uncertainty band is symmetrical with respect to the rack-force-based steering torque.

5. The method of claim 4 wherein the uncertainty band has an upper band limit of 125% of a value of the rack-force-based steering torque and a lower band limit of 75% of the value of the rack-force-based steering torque.

6. The method of claim 4 wherein the uncertainty band has an upper band limit of 115% of a value of the rack-force-based steering torque and a lower band limit of 85% of the value of the rack-force-based steering torque.

7. The method of claim 1 wherein the basic steering torque is based on a vehicle speed and a steering angle present at a steering wheel and is configured for high friction coefficient roads.

8. The method of claim 1 wherein the rack-force-based steering torque is based on an estimated rack force, a vehicle speed, and a measured rack position.

9. A method for controlling a steer-by-wire steering system for a motor vehicle that comprises:
    an electronically controllable steering actuator that acts on steered wheels;
    an activation unit;
    a feedback actuator configured to have a driver demand for a steering angle applied by a driver by way of steering input means and configured to output a feedback signal to the steering input means in reaction to the driver demand and to a driving state of the motor vehicle; and
    a signal transmission means that transmits the driver demand to the activation unit,
    wherein the activation unit activates the electronically controllable steering actuator to transform the driver demand into a deflection of the steered wheels,
    wherein the feedback signal is implemented in a manner dependent on a steering torque,
    wherein the method comprises determining the steering torque according to the method of claim 1.

10. A steer-by-wire steering system for a motor vehicle, the steer-by-wire steering system comprising:
    an electronically controllable steering actuator that acts on steered wheels;
    an activation unit;
    a feedback actuator configured to have a driver demand for a steering angle applied by a driver by way of steering input means and configured to output a feedback signal to the steering input means in reaction to the driver demand and to a driving state of the motor vehicle; and
    a device for signal transmission that transmits the driver demand to the activation unit,
    wherein the activation unit activates the steering actuator to transform the driver demand into a deflection of the steered wheels, wherein the steer-by-wire steering system is configured to perform the method of claim 1.

* * * * *